United States Patent [19]

Sterling et al.

[11] Patent Number: 5,386,899
[45] Date of Patent: Feb. 7, 1995

[54] CLUTCH PLATE MECHANICAL STABILIZER

[76] Inventors: Maurice Sterling; Duane Morgan, both of 1901 Laurel Rd., Oceanside, Calif. 92054

[21] Appl. No.: 154,759

[22] Filed: Nov. 17, 1993

Related U.S. Application Data

[63] Continuation-in-part of Ser. No. 914,739, Jul. 20, 1992, abandoned.

[51] Int. Cl.⁶ .............................................. F16D 3/14
[52] U.S. Cl. ........................... 192/106.1; 188/73.37; 192/30 V; 192/70.17
[58] Field of Search .............. 192/106.1, 70.17, 70.2, 192/30 V; 188/73.37, 71.5, 73.2

[56] References Cited

U.S. PATENT DOCUMENTS

| | | | |
|---|---|---|---|
| 1,674,226 | 6/1928 | Reed | 192/30 V |
| 3,245,508 | 4/1966 | Livezey | 192/70.2 X |
| 3,438,464 | 4/1969 | Barrington | 192/70.2 X |
| 3,631,953 | 1/1972 | Snoy | 192/70.17 |
| 3,653,472 | 4/1972 | Dowell | 192/70.17 X |
| 3,891,066 | 6/1975 | Anderson | 188/73.2 |
| 4,425,994 | 1/1984 | Schele | 192/70.2 X |
| 4,534,457 | 8/1985 | Eltze et al. | 192/70.2 |
| 4,940,124 | 7/1990 | Galuska et al. | 192/30 V X |

FOREIGN PATENT DOCUMENTS

| | | | |
|---|---|---|---|
| 57-167525 | 10/1982 | Japan | 192/30 V |
| 59-34026 | 2/1984 | Japan | 192/30 V |

Primary Examiner—Andrea L. Pitts
Attorney, Agent, or Firm—Dennis W. Beech

[57] ABSTRACT

The clutch plate vibration stabilizer is a simple addition to the standard drive plate of a friction and drive plate clutch assembly. A groove is made in the notch wall on each side of alternate notches in the clutch drive plates of the clutch. Another notch is cut adjacent to the notch wall in the circumference of the drive plate. This allows an O-ring to be placed in the drive plate on the notch wall and retained. These O-rings then serve to cushion the impact between the drive plate notch and the clutch shell keys when the clutch is engaged and disengaged to shift gears. An alternate method of gluing or vulcanizing a C shaped or other shape rubber or elastomer buffer to the wall of the drive plate notch is also described.

12 Claims, 3 Drawing Sheets

CLUTCH PLATE MECHANICAL STABILIZER

This is a continuation-in-part of application Ser. No. 07/914,739, filed Jul. 20, 1992, now abandoned.

FIELD OF THE INVENTION

This invention relates to devices used with clutch assemblies for motor vehicles including motorcycles and scooters as well as other motor driven devices with clutch assemblies that utilize friction and drive plates. The new device provides a simple means to reduce clutch vibration caused when the drive plates hit other elements of the clutch assembly. This reduced vibration reduces noise from the clutch and in some instances provides easier shifting.

DESCRIPTION OF RELATED ART

There are currently in use various types of clutch assemblies to allow shifting of gear ratios between a driving element such as a gasoline engine and the device to be driven such as the rear wheel of a motorcycle. One such common clutch system has a clutch shell in which a series of keys are attached to its inner cylindrical wall. Drive plates with notches corresponding to the keys are then fit into the shell along with friction plates interspersed between the drive plates. The drive plate notches are fit to the keys with a reasonably close tolerance to prevent undue motion between the drive plates and the clutch shell when shifting and engaging the clutch to provide for smooth transition between gears and prevent undue vibration which can cause wear and noise.

When the clutch is disengaged such that the friction and drive plates are not pressed against each other, the drive plates vibrate and make noise or rattle due to the tolerance between the keys and notches. Such tolerance also allows the notches to wear over time thus creating more vibration, noise and wear as the tolerance widens.

These types of clutch assemblies are commonly used in motorcycles, trucks and heavy equipment with multi-disk mechanisms. One type of drive plate in such clutch assemblies makes use of a spring loaded buffer assembly on one side of the drive plate notches on one half of the notches used in the plate. These buffers consist of metallic parts with an enclosure riveted to the plate at the side of the notch with the enclosure containing a ball bearing and a spring mechanism applied to the ball bearing.

The intent of the ball bearing system is to apply constant pressure on the keys to prevent the drive plate notch from constant banging against the keys. However, a disadvantage of this device is that the metallic parts of the buffer can be damaged or broken and thus fall in the clutch assembly causing further damage or difficulty in operation of the clutch.

Neither close attention to tolerances or the metallic spring loaded buffer assembly has effectively eliminated the vibration, noise or wear of the plates. The noise is particularly noticeable in clutch assemblies used with belt drives instead of chain drives. When a belt drive is used the option of eliminating the primary drive cover or using a more open style guard is often implemented. With this cover eliminated any noise can be more readily heard. A further disadvantage of the metallic spring loaded buffer assembly is that it can not be easily repaired when damaged or broken.

The present invention combines the use of simple O-rings with the existing drive plate notches to reduce the vibration and noise. The drive plate notches are simply modified with a small groove on each notch wall and an O-ring notch cut into the drive plate circumference adjacent to each side of the drive plate notch at a sufficient distance to allow an O-ring to be retained. This is normally done for half of the notches on the drive plate to allow for a sufficient buffer and to prevent interference between O-rings on adjacent drive plates. However, where there is sufficient tolerance between plates, all notches may have O-rings. The O-rings thus retained serve as a buffer to cushion the contact between the clutch shell keys and the drive plate notches to reduce the metal to metal contact noise. This also helps the plates to be centered in the clutch shell which provides a more balanced assembly.

Other means may be used to provide a rubber or cushion buffer between the keys and notches such as any elastomer or rubber that can be vulcanized or glued into the friction plate notch. An elastomer can also be mounted on the keys.

SUMMARY OF THE INVENTION

A primary objective of the present invention is to provide a buffer or cushioning device for use in friction and drive plate clutch assemblies to reduce the vibration and noise of metal contact between the drive plates and clutch shell keys. A further object is to provide a buffer which is easily installed and repaired, that can be retrofit into existing clutch assemblies and that has no metallic parts which could damage other parts of the clutch assembly.

Another object of the invention is to reduce wear of the clutch shell keys and drive plate notches.

In accordance with the description presented herein, other objectives of this invention will become apparent when the description and drawings are reviewed.

DESCRIPTION OF THE PREFERRED EMBODIMENT

The clutch plate mechanical stabilizer consists of a series of O-rings mounted on the sides of one half of the drive plate key notches in a friction and drive plate clutch assembly. The clutch plate mechanical stabilizer buffer works in both an oil or dry clutch assembly. The O-rings are retained by a groove in the drive plate key notch wall and by an O-ring notch in the drive plate circumference adjacent to the drive plate key notch.

Figure 1:
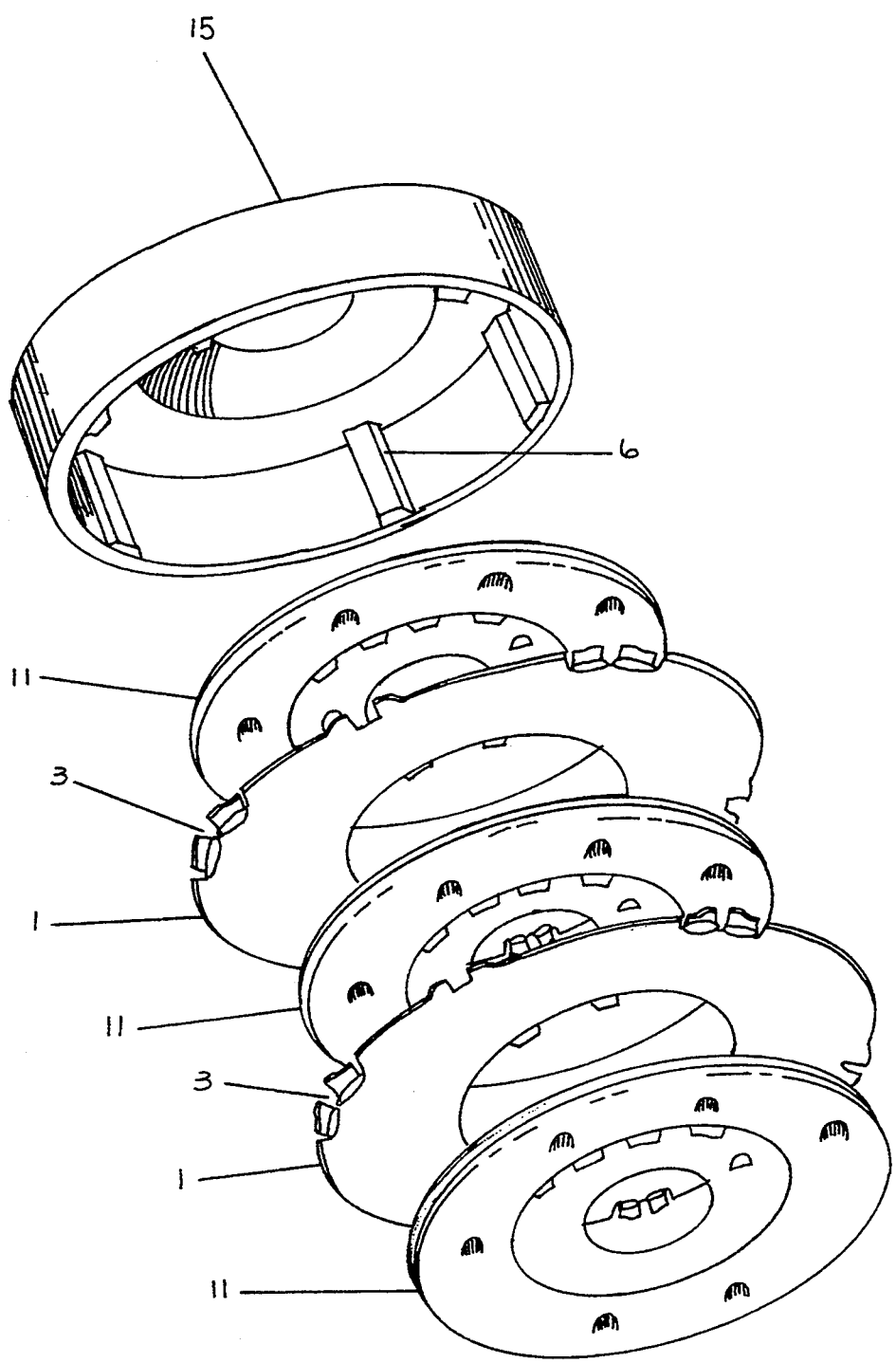
FIG. 1 illustrates a perspective view of an exploded representation of a portion of a typical friction and drive plate clutch assembly.
Figure 2:
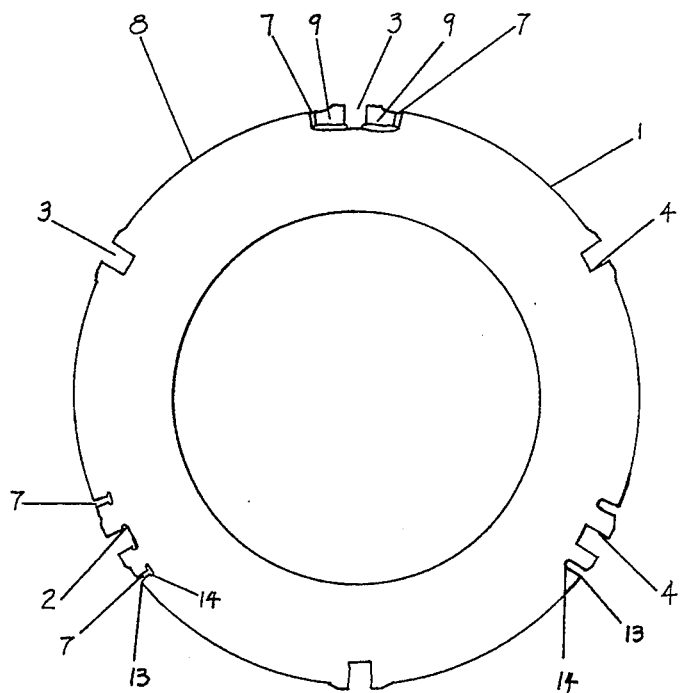
FIG. 2 illustrates a front view of a drive plate modified for the clutch plate mechanical stabilizer using O-rings.
Figure 6:
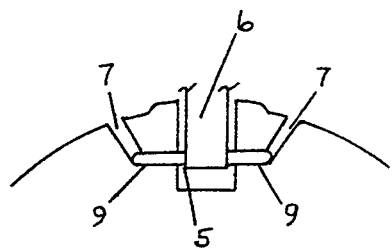
FIG. 6 illustrates a section of a drive plate with O-ring notches and O-rings relative to a key.

Referring to FIGS. 1, 2 and 6, a drive plate (1) has a groove (2) in the drive plate key notch (3) on the notch walls (4) on one half of the drive plate key notches (3). This is done on alternate drive plate key notches (3) on each notch wall (4). It has also been found that using only two diametrical opposite drive plate key notches (3) is effective. The groove (2) is preferably located on the notch wall (4) toward the bottom (5) of the key (6) position in the drive plate key notch (3) to provide sufficient notch wall (4) metal above the groove (2) for strength in contact with the keys (6). This location also allows sufficient buffer to cushion the contact between the drive plate key notch (3) and key (6) and allows for longitudinal motion of the drive plate (1) relative to the keys (6) when the clutch assembly is engaged and disengaged.

Figure 5:
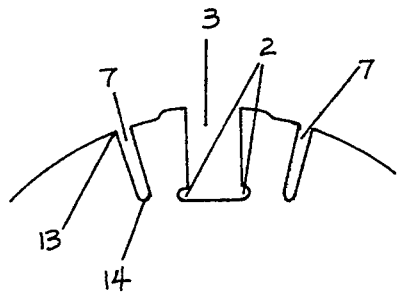
FIG. 5 illustrates a section of a drive plate having O-ring notches slanted relative to the perpendicular to the circumferential edge.

The drive plate (1) has an O-ring notch (7) in its circumference adjacent to and on each side of the drive plate key notches (3) which have grooves (2) therein. The O-ring notches (7) are located at a distance from the drive plate key notches (3) such that when an O-ring (9) is placed on the drive plates (1) it is retained in the groove (2) and O-ring notch (7) by the force of the stretching of the rubber of the O-ring (9) when placed on the drive plate (1). The O-ring notch (7) may be perpendicular to the circumferential edge (8) which causes the O-ring notch top (13) to be relatively further in distance from the notch wall (4) than the O-ring notch bottom (14) as illustrated in FIG. 5.

Figure 4:
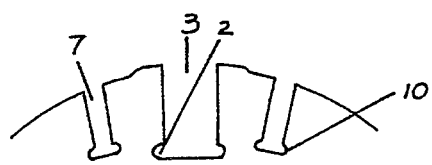
FIG. 4 illustrates a section of a drive plate modified with O-ring notches having a larger diameter base.

The O-ring notch (7) may be slightly slanted from perpendicular to the circumferential edge (8) as shown in FIG. 6 in order to retain the O-ring (9) or it may be perpendicular to the circumferential edge (8) with a larger diameter base (10) as illustrated in FIG. 4.

Figure 7:
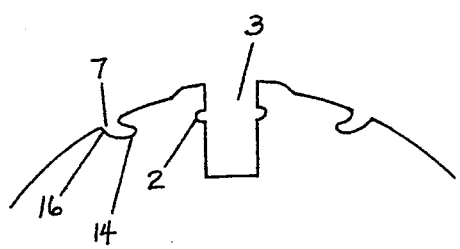
FIG. 7 illustrates a section of a drive plate with O-ring notches.
Figure 8:
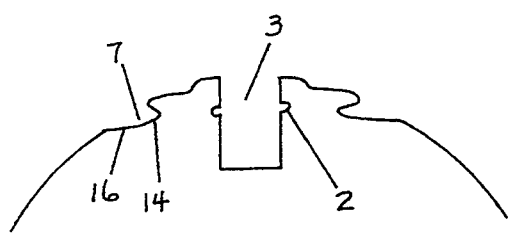
FIG. 8 illustrates a section of a drive plate with O-ring notches having a side edge removed.

Other variations of the O-ring notch (7) are possible as illustrated in FIGS. 7 and 8. In this instance the O-ring notch (7) is in the shape of a hook or curved toward the notch wall at the O-ring notch bottom (14). The O-ring notch (7) has a curvature toward the notch wall (4) at the O-ring notch bottom (14). This curve in the O-ring notch bottom (14) ends in a position relatively opposite the groove (2). FIG. 8 illustrates an O-ring notch (7) in which the far wall (16) has been widened for ease of manufacture of the O-ring notch (7) in the drive plate (1).

The size, shape and composition of the O-ring (9) must be selected based on the size of the clutch assembly. For the typical motorcycle clutch an O-ring (9) that is round in shape with a thickness of 3/32 inches and made of Nitrile rubber with a 70 shore rating has been found to be suitable. This is based on a clutch assembly which has a ½ inch wide key (6) and a tolerance between the key (6) and the notch wall (4) of 1/64 inches. The groove (2) in this case is 1/16 inches deep in the notch wall (4). This arrangement maintains a 1/64 inch interference fit. Square O-rings may also be used.

In experiments with the clutch plate mechanical stabilizer, it has been found that in addition to reducing clutch assembly noise there is a reduction in the harshness that is heard and felt when shifting gears. It appears that the buffers restriction of movement between the drive plates (1) and keys (6) helps to synchronize the engine and drive train by controlling erratic movement or force caused by imperfection in clutch plates, debris between the plates and other imperfections in parts and tolerances.

Figure 3:
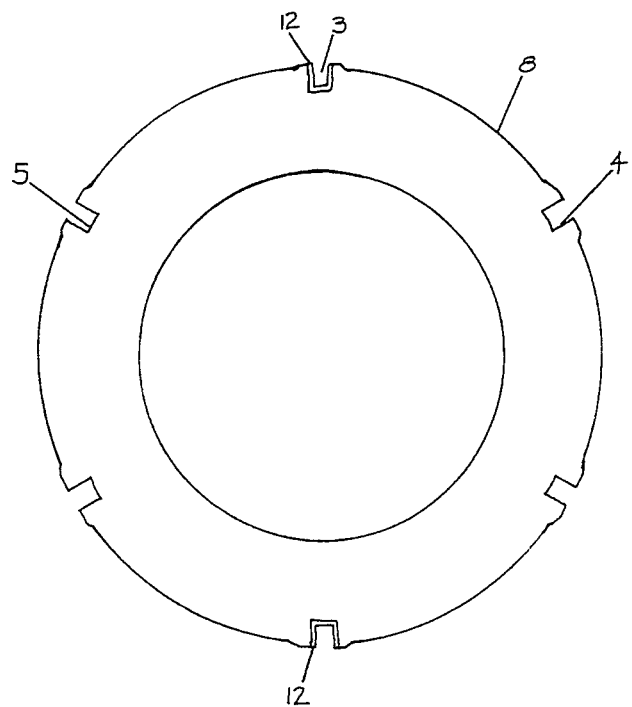
FIG. 3 illustrates an alternate version of the mechanical stabilizer using a C-shaped elastomer.

Referring to FIG. 3, a C buffer (12) is glued, vulcanized or otherwise attached to the drive plate key notch (3) to provide a buffer between the keys (6) and the drive plate key notch (3). This is an alternate method to that of using O-rings as described herein. Other means of providing a rubber or elastomer buffer between the keys (6) and drive plate key notch (3) are also possible such as attaching O-rings or a rubber cap to the keys (6) on the clutch shell (15).

I claim:

1. A clutch assembly having a device for reducing vibration and noise during clutch disengagement comprising: a plurality of drive plates each having an outer circumferential edge; wherein said drive plates are each provided with at least two radially extending diametrically opposite key notches at said circumferential edge; said key notches each having two spaced notch walls parallel to one another; a groove is provided in each notch wall on alternate key notches; an O-ring notch is provided in said circumferential edge of each drive plate adjacent to and circumferencially spaced from each side of the drive plate key notches; and a plurality of rubber O-rings are mounted on said circumferential edge of each drive plate such that each O-ring is retained in said groove in each notch wall and said adjacent O-ring notch by a force created from stretching each O-ring between said groove and O-ring notch.

2. The device according to claim 1, wherein each said O-ring notch is perpendicular to the drive plate circumferential edge.

3. The device according to claim 1, wherein each said O-ring notch is perpendicular to the drive plate circumferential edge and has a notch groove at its radially innermost portion.

4. The device according to claim 1, wherein said O-ring is made from Nitrile rubber with a hardness rating of 70 shore.

5. A clutch assembly having a device for reducing vibration and noise during clutch disengagement comprising: a plurality of drive plates each having an outer circumferential edge; wherein the drive plates each have at least two radially extending diametrically opposite key notches at the circumferential edge; the key notches each having two spaced notch walls parallel to one another; a groove is provided in each notch wall on at least two key notches; an O-ring notch is provided in the circumferential edge of each drive plate adjacent to and circumferencially spaced from each side of the drive plate key notches having grooves therein; and a plurality of rubber O-rings are mounted on the circumferential edge of each drive plate such that each O-ring is retained in the groove in each notch wall and the adjacent O-ring notch by a force created from stretching each O-ring between the groove and the O-ring notch.

6. The device according to claim 5, wherein each O-ring notch is perpendicular to the drive plate circumferential edge.

7. The device according to claim 5, wherein each O-ring notch is slanted toward the notch wall relative to the perpendicular to the drive plate circumferential edge.

8. The device according to claim 5, wherein each O-ring notch is curved toward the notch wall at an O-ring notch bottom.

9. The device according to claim 8, wherein each O-ring notch is widened at an O-ring top (13) at a far wall (16).

10. The device according to claim 5, wherein the groove is positioned in the notch wall to coincide with a key positioned in the key notch at a bottom.

11. The device according to claim 5, wherein there are at least four radially extending key notches at the circumferential edge and the groove is provided in each notch wall on alternating key notches.

12. A clutch assembly having a device for reducing vibration and noise during clutch disengagement comprising: a means for retaining an O-ring in a plurality of drive plates each having an outer circumferential edge, wherein the drive plates each have at least two radially extending diametrically opposite key notches at the circumferential edge, the key notches each having two spaced notch walls parallel to one another; including a groove provided in each notch wall on at least two key notches, and an O-ring notch provided in the circumferential edge of each drive plate adjacent to and circumferencially spaced from each side of the drive plate key notches having grooves therein.

* * * * *